United States Patent [19]

Scheibler et al.

[11] 3,915,675

[45] Oct. 28, 1975

[54] PROCESS FOR THE RECOVERY OF NITROGEN MONOXIDE

[75] Inventors: Erich Scheibler; Klaus Hopfer, both of Dortmund, Germany

[73] Assignee: Friedrich Uhde GmbH, Dortmund, Germany

[22] Filed: June 28, 1973

[21] Appl. No.: 374,407

[30] Foreign Application Priority Data

July 25, 1972 Germany............................ 2236341

[52] U.S. Cl. .......................... 55/69; 55/68; 55/70; 55/89
[51] Int. Cl.² ........................................ B01D 47/00
[58] Field of Search ............... 55/68, 70, 69, 80, 89, 55/93, 94, 49, 50, 36

[56] References Cited
UNITED STATES PATENTS

| | | | |
|---|---|---|---|
| 3,054,726 | 9/1962 | Fields et al. | 55/70 |
| 3,404,072 | 10/1968 | Bollen et al. | 55/70 X |
| 3,475,118 | 10/1969 | Fletcher et al. | 55/68 |
| 3,489,515 | 1/1970 | Jockens et al. | 55/68 |

*Primary Examiner*—John Adee
*Attorney, Agent, or Firm*—Malcolm W. Fraser

[57] ABSTRACT

A process for the recovery of very pure nitrogen monoxide from a gas stream originating preferably from an ammonia oxidation process and containing nitric oxides, the acid condensates being processed to obtain nitric acid of medium concentration, and water vapour condensate. A mixture of nitric oxides and steam is cooled by a cooling fluid and scrubbed with condensate from a nitric acid distillation unit. The combined acid condensates are degassed and the gas obtained to the product line ahead of the gas scrubbing unit is recycled. The effluent from the degassing unit is distilled to a nitric acid concentration, and the noncondensible gas components are withdrawn from the condenser of the nitric acid distillation unit and admixed to the hot gas stream ahead of the first process step.

5 Claims, 1 Drawing Figure

U.S. Patent  Oct. 28, 1975  3,915,675
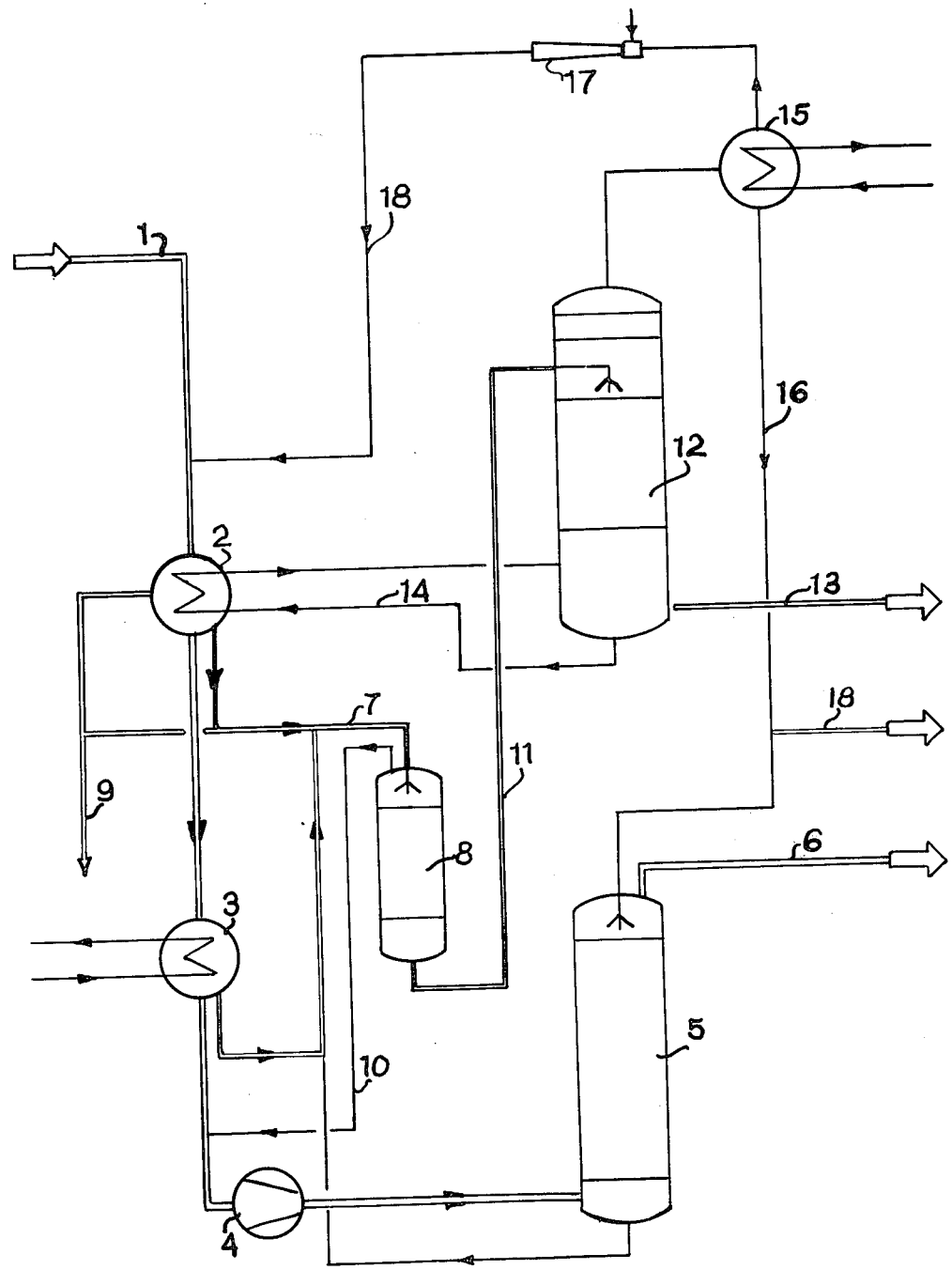

PROCESS FOR THE RECOVERY OF NITROGEN MONOXIDE

BACKGROUND AND SUMMARY OF THE INVENTION

The present invention relates to a process for the recovery of very pure nitrogen monoxide from a gas stream originating preferably from an ammonia oxidation process and containing nitric oxides, the acid condensates being processed to obtain nitric acid of medium concentration, and water vapour condensate.

Very pure nitrogen monoxide should be defined in that the gas produced contains more than 90% NO and only traces of $NO_2$. Nitric acid of medium concentration should be defined as acid of about 50 to 65% by weight of $HNO_3$. The maximum acid content of the water vapour condensate may be 0.5% by weight.

Processes for the recovery of nitrogen monoxide should be directed to achieving a substantial conversion of the feedstock into the finished product and a high final concentration of the finished product or products while process waste-water is not discharged to the environment at all or with a minimum of harmful components. According to the present invention, ammonia is used as feedstock which is subjected to conversion with oxygen and steam in the presence of a catalyst.

The recovery of high purity nitrogen monoxide is achieved by using preferably pure oxygen for the catalytic ammonia oxidation and by adding steam to the gas mixture both for temperature control and for avoiding the formation of explosive mixtures of $NH_3$ and $O_2$. This steam is subsequently precipitated by condensation together with the water of oxidation. However, good yields cannot be obtained when adding the exact stoichiometric quantity of $O_2$ that is needed for the recovery of nitrogen monoxide. A certain definite excess of oxygen is required. This means, however, that nitric oxides of a higher valency than NO are produced simultaneously which must be eliminated from the gas in a subsequent process step. To keep $NH_3$ losses at a minimum, these oxides are preferably converted to nitric acid, which is the form of highest valency nitrogen, and subsequently separated.

However, nitric acid, water vapour, and water of oxidation are not obtained as separate streams but as a mixture that can hardly be utilized for any technical purposes. Consequently, it is desirable to obtain concentrated and marketable nitric acid on the one hand, and preferably non-polluting water on the other hand.

A known process for the recovery of high purity nitrogen monoxide is described in German patent DAS No. 1,224,715, said process yielding not only high purity nitrogen monoxide but also nitric acid of less than 1% by weight concentration, and nitric acid at a concentration of more than 15% by weight, preferably 18 to 21% by weight. A substantial portion of the sensible heat of the gas and all heat of condensation is dissipated to cooling water. The byproduct acid condensate obtained at the low concentrations requires imported energy for further processing unless process facilities are available that can handle the high water content. Imported energy is not always available or constitutes an additional expenditure. The combination with a processing facility will require the latter to absorb the additional energy requirements, and in case of plant disturbances the recovery of nitrogen monoxide must be stopped as well.

The object of the present invention is to separate a mixture of nitric acids and water vapour to obtain marketable products, such as high purity nitrogen monoxide and nitric acid of medium concentration, while discharging process condensate with a very low nitric acid content.

According to the present invention, this object can be achieved by the following process steps: cooling the nitric oxide/steam mixture, which is at about 150°–200°C, by indirect heat exchange to 50°–80°C, preferably 60°–70°C, by means of nitric acid of medium concentration, subjecting the gas stream to further indirect heat exchange with a cooling fluid, scrubbing the gas stream with condensate from the nitric acid distillation facility, degassing the combined acid condensates from the first and second cooling steps and the scrubbing condensate and returning the gas into the product line ahead of the gas scrubbing unit, subjecting the effluent from the degassing step to distillation for raising the nitric acid concentration to about 50–65% by weight, withdrawing the non-condensible gas components from the condenser of the nitric acid distillation unit and admixing them to the hot gas stream ahead of the first process step.

The invention incorporates the particular advantage that, after utilizing a substantial part of the heat of combustion, the nitric oxides of the gas stream are converted in a simple way to high purity nitrogen monoxide and medium concentration marketable nitric acid. It is not necessary to incur particular expenditures from the standpoint of equipment and energy because any portion of ammonia that is not converted to nitric oxide is transformed into a marketable byproduct without requiring further production facilities.

Any condensate that must be withdrawn from the process for reasons of material balance has an acid content of less than 0.5% by weight. After adequate neutralization, this condensate can be used as feedwater for steam production or may be discharged to the sewer. The power steam admitted to the steam jet ejector in the distillation unit has a positive influence on the heat balance.

BRIEF DESCRIPTION OF THE DRAWING

The FIGURE represents a flowsheet showing the steps following in accordance with this invention.

DESCRIPTION OF THE PREFERRED EMBODIMENT

The combustion gas, a mixture substantially consisting of nitric oxides and steam, preferably from an ammonia oxidation unit, passes at 150°–200°C through line 1 into the gas cooler - reboiler 2 after having dissipated part of its combustion heat for steam production in a waste heat boiler that is not shown on the flowsheet. In the gas cooler - reboiler 2, the combustion gas is heat exchanged against nitric acid of medium concentration to dissipate a major portion of its available sensible heat and heat of condensation.

The gas cooler - reboiler should preferably be designed to permit withdrawing the condensate in two stages. In this way, it would be possible, for example, to obtain a first stream at 0.5% by weight of $HNO_3$ and a second stream at about 10% by weight of $HNO_3$. After leaving the gas cooler - reboiler, the gas which is now at 50° to 80°C, passes through a final gas cooler 3 where its temperature is lowered, for example with the aid of cooling water, to some degrees above the cooling water temperature, for example 25° to 30°C. Further water vapour contained in the gas is precipitated by condensation in the final gas cooler 3, and the condensate obtained has a nitric acid concentration of about 5% by weight.

After the substantial extraction of nitric oxides of higher valency, the NO gas passes to a liquid seal compressor 4 where its pressure is raised to 1.5 atm.g. and is then sent to a scrubber 5 where the $NO_2$ content is reduced to traces. The NO gas obtained is available for withdrawal from a line 6.

The condensate streams from the gas cooler - reboiler 2, the final cooler 3, and the scrubber 5 are combined and sent through a line 7 to a degassing tower 8 where dissolved nitric oxides are liberated. Depending on the quantity of condensate obtained in the gas cooler - reboiler 2, it is also possible to withdraw condensate with less than 0.5% by weight of acid through a line 9 for being discharged as waste water. Gas components liberated in the degassing tower 8 are sent through a line 10 to the connecting line between the final cooler 3 and a liquid seal compressor 4. The combined degassed condensate with its $HNO_3$ content passes through a line 11 to a vacuum distillation column or tower 12. With the aid of the heat available from the gas cooler - reboiler 2, part of the acid condensate is expelled by distillation so that nitric acid of about 50 –65% by weight of $HNO_3$ can be withdrawn through a line 13 from the distillation column 12. Line 14 is a schematic representation of heat flow conditions between the gas cooler - reboiler 2 and the distillation column 12. Effluent streams from a water cooled condenser 15 are practically pure condensate with less than 0.3% by weight of nitric acid and an inert gas which contains nitric oxides and nitrogen.

Effluent condensate is sent through a line 16 into the scrubber 5 or is discharged as wastewater through a line 18. Steam jet ejector 17 removes the inert gases from the condenser 15 while maintaining in the distillation column the necessary vacuum for distillation at temperatures of 60°–70°C, and forces the inert gases through a line 18 into line 1.

If a particularly low $NO_2$ content in the product gas is desirable, the scrubber 5 should preferably be divided and equipped with a separate scrubbing fluid circuit.

NUMERICAL EXAMPLE

A mixture of 190 kg/hr. $NH_3$ and 1690 kg/hr. oxygen and steam was subjected to catalytic oxidation. After lowering the temperature of the gas to 190°C in a waste heat boiler, the mixture was cooled to 75°C in a heat exchanger. This step yielded approximately 1430 kg/hr. nitric acid of about 1% concentration. The sensible heat and the heat of condensation to be dissipated was utilized in the nitric acid distillation unit. The gas containing nitric oxide was further cooled to 30°C in a gas cooler; this step yielded 160 kg/hr. nitric acid of approximately 15% concentration. The gas was then compressed to about 1.9 atm. abs., and the residual nitric oxide content was reduced to about 2.5 g $NO_2/Nm^3$ in a scrubbing column with the aid of 400 kg/hr. water vapour condensate.

The nitric acid streams of 1 and 15% concentration and the scrubbing fluid with an $HNO_3$ content of about 8% were fed to a distillation column and subjected to distillation at about 60 Torr. Nitric acid was obtained as bottom product at a rate of 120 kg/hr. and a concentration of 60% by weight. About 1870 kg/hr. of water vapour condensate was withdrawn from the condenser as practically pure water. Part of this water was fed as scrubbing liquid to the scrubbing column, part was used as feedwater in the waste-heat boiler, the rest was discharged as wastewater without previous dilution.

What we claim is:

1. A process for the recovery of nitrogen monoxide at a concentration greater than 90% and nitric acid of concentration of 50 to 65% by weight from a feed stream, said feed stream originating preferably from an ammonia oxidation process, said feed stream having been cooled, said process comprising of the following steps:
   I. cooling a feed stream,
   II. cooling the feed stream in an indirect cooling zone employing product nitric acid as the coolant thereby producing a cooled gas feed stream and a first condensate of dilute nitric acid,
   III. cooling the cooled feed stream in a second cooling zone producing a final cooled feed stream and a second condensate of dilute nitric acid that is combined with the first condensate,
   IV. scrubbing the final cooled feed stream in an $NO_2$ scrubbing zone thereby producing NO of concentration greater than 90% and a third condensate that is combined with the first and second condensates to produce combined condensates,
   V. removing gas from the combined condensates and recycling the gas ahead of the $NO_2$ scrubbing zone and retaining the degassed condensate,
   VI. distilling the degassed condensate in a distilling zone thereby producing a nitric acid of concentration of 50–65% by weight, water and non-condensable gases, VII. withdrawing the non-condensable gases from the distilling zone and admixing them to the hot feed stream ahead of Step II and employing the water from the distillation zone as feed water for the system, cooling water, and water for use in the $NO_2$ scrubbing zone.

2. A process for the recovery of nitrogen monoxide at a concentration greater than 90% and nitric acid of concentration of 50 to 65% by weight from a gas feed stream, said gas feed stream originating preferably from an ammonia oxidation process, said gas feed stream having been cooled, said process comprising of the following steps:
   I. conveying a gas feed stream through a waste heat boiler to cool the gas feed stream to 150°–200°C to produce a modified gas feed stream,
   II. leading the modified gas feed stream through feed line 1 to a gas cooler-reboiler 2,
   III. cooling the modified gas feed stream to 50°–80°C in the gas cooler-reboiler 2 by indirect heat exchanging against nitric acid thereby producing a reduced in-nitric-acid modified gas feed stream and a first condensate that is liquid nitric acid from 0.5 to 10% by weight of $HNO_3$,
   IV. withdrawing the first condensate of nitric acid from the gas cooler-reboiler with less than 0.5 % by weight of nitric acid through line 9 as waste water, V. withdrawing the first condensate that has greater than 0.5% nitric acid through line 7, VI. leading the reduced-in-nitric acid modified gas feed stream to a cooler 3, VII. cooling the reduced-in-nitric acid modified gas feed stream to 25° to 30°C with the indirect aid of cooling water thereby producing a second condensate that is nitric acid of about 15% by weight and a gas that is the cooled reduced-in-nitric acid modified gas feed stream, VIII. withdrawing the second condensate and mixing it with the first condensate in line 7, IX. leading the cooled reduced-in-nitric acid modified gas feed stream to liquid seal compressor 4 for compression, to about 1.9 atm, X. leading the compressed cooled reduced-in-nitric acid modified gas feed stream to a nitrogen dioxide scrubber 5 employing 400 kg/hr water vapor condensate where the NO₂ content is reduced to traces thereby producing a gas that is greater than 90% pure NO and a third condensate containing nitric acid, XI. withdrawing the pure NO through line 6, XII. withdrawing the third condensate and adding it to the first and second condensate in line 7, XIII. leading the first, second and third condensates in line 7 to degassing tower 8 thereby liberating nitric oxide gases and retaining a fourth condensate of nitric acid, XIV. leading the nitric oxide gases to liquid seal compressor 4 for processing of Step IX, XV. withdrawing the fourth condensate from degassing tower 8 and leading it in line 11 to tower 12 for vacuum distillation at 60°–70°C and 60 torr wherein nitric acid of 50–65% by weight is produced and gas containing nitric oxides and residual nitric acid is evolved and water vapor is condensed in the condenser, XVI. leading part of the 50–65% by weight nitric acid through line 13 for withdrawal and part through line 14 to serve as an indirect coolant for gas cooler-reboiler 2 in Step II, XVII. withdrawing the water vapor from the condenser to use both as scrubbing liquid in NO₂ scrubber 5 Step X and as feed water in the waste heat boiler employed in Step I, XVIII. leading the gas containing nitric oxides and residual nitric acid to a condenser 15 thereby producing a condensate of nitric acid and a gas of nitric oxides, XIX. withdrawing the nitric acid in line 16 into scrubber 5 or discharging it as waste water through line 18, XX. leading the gas of nitric oxides from Step XVIII to a steam jet ejector 17 which forces the gases into line 18 to be added to line 1 while simultaneously maintaining in tower 12 the necessary vacuum for distillation at temperatures of 60°–70°.

3. A process of claim 1 wherein Step I the feed stream is cooled to a temperature between 100° and 200°C.

4. A process of claim 1 wherein Step II the feed stream is cooled to 50° to 80°C.

5. A process of claim 1 wherein Step III the cooled gas stream is cooled to 25°–30°C.

* * * * *